US 7,826,163 B2

(12) United States Patent
Harmer et al.

(10) Patent No.: US 7,826,163 B2
(45) Date of Patent: Nov. 2, 2010

(54) LARGE SHOCK PARTICLE MITIGATION

(75) Inventors: Brent Jay Harmer, Johnstown, CO (US); Marinko Bosnich, Berthoud, CO (US); Abhay Tejmal Kataria, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 790 days.

(21) Appl. No.: 11/540,365

(22) Filed: Sep. 29, 2006

(65) Prior Publication Data

US 2008/0080085 A1    Apr. 3, 2008

(51) Int. Cl.
G11B 5/41    (2006.01)
(52) U.S. Cl. .................................. 360/75; 360/78.04
(58) Field of Classification Search .................. None
See application file for complete search history.

(56) References Cited

U.S. PATENT DOCUMENTS

| | | | |
|---|---|---|---|
| 6,018,431 A * | 1/2000 | Carlson et al. ............... 360/75 |
| 6,115,200 A * | 9/2000 | Allen et al. ................... 360/75 |
| 6,226,140 B1 * | 5/2001 | Serrano et al. ............... 360/75 |
| 6,226,151 B1 | 5/2001 | Haddock | |
| 6,230,380 B1 | 5/2001 | Wang et al. | |
| 6,419,551 B1 | 7/2002 | Smith | |
| 6,482,505 B1 | 11/2002 | Bertero et al. | |
| 6,600,635 B2 | 7/2003 | Smith | |
| 6,795,262 B1 * | 9/2004 | Codilian et al. ............... 360/75 |
| 6,882,489 B1 * | 4/2005 | Brunnett et al. ............... 360/75 |
| 6,967,804 B1 * | 11/2005 | Codilian ...................... 360/75 |
| 7,088,544 B2 * | 8/2006 | Jeong et al. .................. 360/75 |
| 7,333,282 B2 * | 2/2008 | Iseri et al. .................... 360/75 |
| 7,545,593 B1 * | 6/2009 | Sun et al. ..................... 360/31 |
| 2003/0048566 A1 | 3/2003 | Fayeulle | |
| 2006/0130874 A1 | 6/2006 | Lee et al. | |

* cited by examiner

*Primary Examiner*—Hoa T Nguyen
*Assistant Examiner*—James L Habermehl
(74) *Attorney, Agent, or Firm*—David K. Lucente

(57) ABSTRACT

A system is capable of detecting a "large" shock. In contrast to just any shock, a large shock exceeds some threshold of magnitude or duration and may generate particles and/or the deposit of particles on a recording head, which can result in write errors. Responsive to detection of a large shock, the system can take corrective action, such as executing one or more corrective action seeks after detection of the large shock or executing a series of corrective actions seeks during a certain number of load operations after detection of the large shock. RAW verifications may be performed to confirm correct write operation of the recording head after such corrective action.

22 Claims, 8 Drawing Sheets

LARGE SHOCK PARTICLE MITIGATION

BACKGROUND

Portable disc drive devices share a common problem: they are often dropped, bumped, or shaken. If the shock from such an occurrence is severe enough, the occurrence may be referred to as a "large shock event". If the drive is operating during a large shock event, the resulting impact can cause the disc recording head to impact the storage medium surface, erasing data and potentially damaging the recording head. Such impact can also dislodge particles from the media surface.

In addition, many modern hard disc drives have ramp assemblies at the outer diameter of the storage medium disc. Ramp assemblies are used to prevent the actuator assembly and specifically the recording head it supports from contacting the media surface when the recording head is in a parked or non-operating position. During shock events, the ramp assembly itself can impact the media surface near the outer diameter and generate particles.

Particles generated from such shock events can deposit on the recording head, resulting in excessive fly height and poor write performance. Conventional error handling methods with Read After Write (RAW) verification attempt multiple retries in order to successfully complete the write operation. However, particles that have become deposited on the recording head may require an extended period of time to dissipate, resulting in the write operation exceeding system timeout limits.

SUMMARY

Implementations described and claimed herein address the foregoing problems by detecting "large" shocks and removing particles potentially deposited on a recording head attached to an actuator assembly of a disc drive, responsive to such detection. In one implementation, output of a shock sensor is monitored over a sequence of sensor samples. If the sensor samples indicate a sustained shock over a number of samples, a large shock can be detected. Responsive to detection of a large shock, servo control circuitry can execute one or more corrective action seeks, such as full stroke seeks, to throw off or otherwise remove particles deposited on the recording head. Also, the movement of the recording head above the storage media surface can also dislodge particles on that surface, thereby reducing the possibility that a surface particle may be picked up by the recording head during operation. A RAW verification can be performed to confirm successful removal of particles from the recording head, if any had been previously deposited.

In another implementation, after a large shock detection, the servo control circuitry can execute one or more seeks, such as full stroke seeks, after each of the next x number of load operations from the ramp, where x represents a threshold number of loads. In this way, the servo control circuitry can attempt to remove particles that may have been picked up in and around the outer diameter of the storage medium disc, particularly those particles generated by ramp-disc contact.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. It should also be understood that, although disc drive implementations are described here, the described technology may be applied to other systems.

DETAILED DESCRIPTIONS

A disc drive is a data storage device used to store digital data. A typical disc drive includes a number of rotatable recording discs (i.e., storage medium discs) that are axially aligned and mounted to a spindle motor for rotation at a high rotational velocity. A corresponding array of read/write heads access tracks defined on the respective disc surfaces to write data to and read data from the discs. Although certain implementations are described herein in the context of disc drives, the described technology may be employed in other systems as well.

One implementation of the described technology detects a "large" shock. In contrast to just any shock, a large shock exceeds some threshold of magnitude or duration. Large shocks are believed to more frequently result in the generation of particles and/or the deposit of particles on the recording head, which can result in write errors. For example, a particle deposited on the recording head can cause the recording head to move at a higher than desired fly height and cause hard write errors.

Generally, a large shock represents a shock of sufficient magnitude and/or duration to result in a contact between the recording head and the storage medium surface (a) to cause a particle on the surface to become deposited on the recording head; and/or (b) to generate a particle from the storage medium surface or asperity on the storage medium surface. For some systems, a drop of approximately 4 inches to a hard surface will result in particle deposits on the recording head or generations of particles or asperity, although it should be understood that drops from a lesser height may cause such effects. Accordingly, in one implementation, a large shock threshold has been set to represent a drop from approximately 1 inch to a hard surface. Based on tests of this nature, a large shock threshold of 100 counts has been set in some implementations, although it should be understood that factors such as the physical shock threshold of the shock sensor, the shock resistance of the storage system, and the weight may affect the number of counts used as the large shock threshold.

Responsive to detection of a large shock, a system can take corrective action. For example, in one implementation, servo control circuitry executes one or more corrective action seeks of the actuator assembly in an attempt to dislodge particles. In an alternative implementation, the servo control circuitry executes one or more corrective action seeks of the actuator assembly during each of the next x number of load events. RAW verifications may be performed to confirm correct write operation of the recording head after such corrective action.

Figure 1:
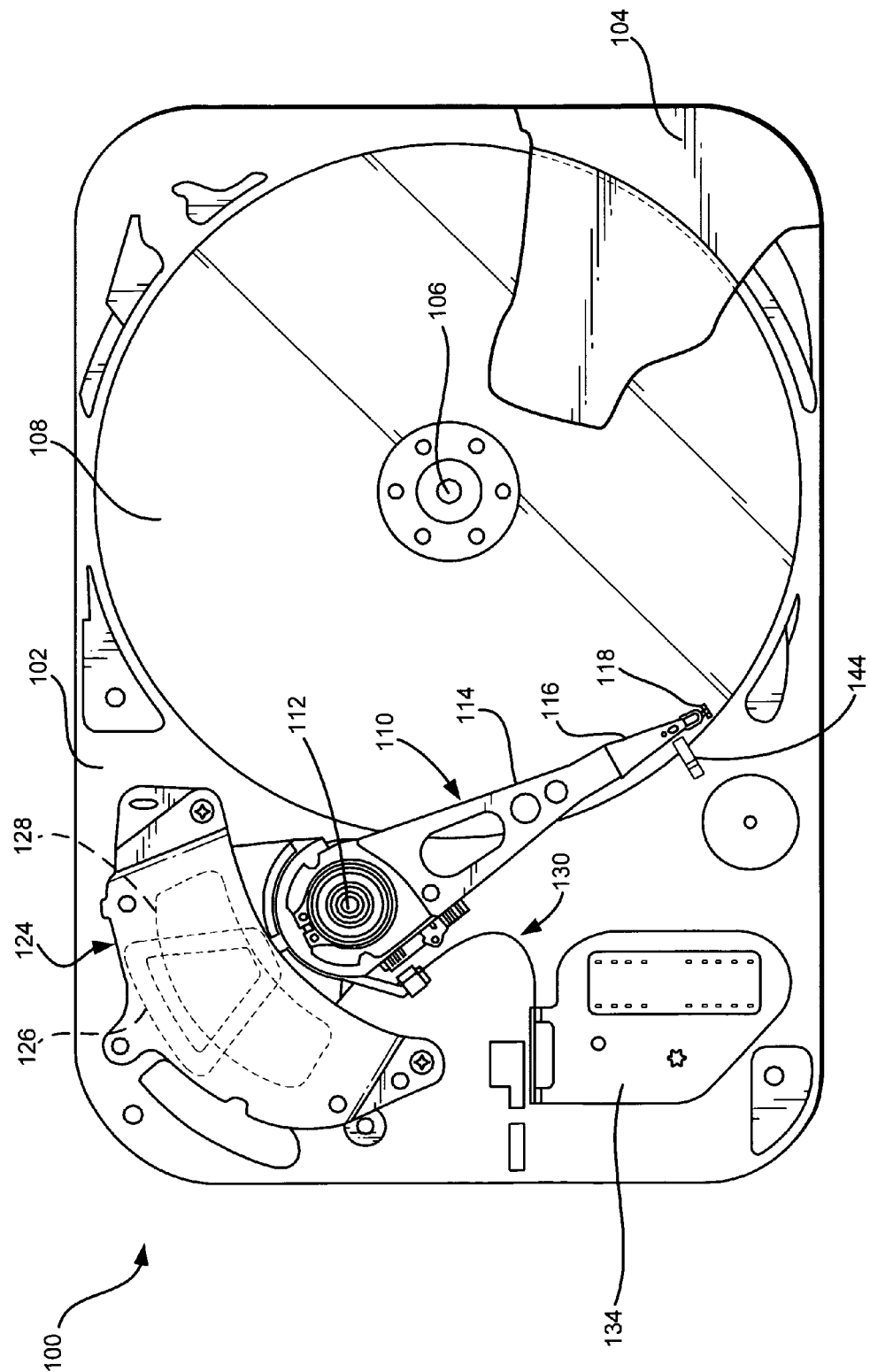
FIG. 1 illustrates a plan view of an example disc drive

FIG. 1 illustrates a plan view of an example disc drive 100. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more storage medium discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108. The distance between the head 118 and the storage media surface during flight is referred to as the "fly height".

During a seek operation, the track position of the head 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved away from portions of the disk 108 containing data when the drive motor is de-energized. The heads 118 are secured over portions of the disk not containing data through the use of an actuator latch arrangement and/or ramp assembly 144, which prevents inadvertent rotation of the actuator assembly 110 when the drive discs 108 are not spinning.

A flex assembly 130 provides the requisite electrical connection paths for the actuator assembly 110 while allowing pivotal movement of the actuator assembly 110 during operation. The flex assembly 130 includes a printed circuit board 134 to which a flex cable 132 connected with the actuator assembly 100 and leading to the head 118 is connected. The flex cable 132 may be routed along the actuator arms 114 and the flexures 116 to the heads 118. The printed circuit board 134 typically includes circuitry for controlling the write currents applied to the heads 118 during a write operation and a preamplifier for amplifying read signals generated by the heads 118 during a read operation. The flex assembly 134 terminates at a flex bracket 136 for communication through the base deck 102 to a disc drive printed circuit board (not shown) mounted to the bottom side of the disc drive 100.

In an exemplary implementation, servo control circuitry in the disc drive 100 includes a power amp, a controller, and a memory containing program code for detecting a large shock, performing corrective action, and/or performing RAW verification.

Figure 2:
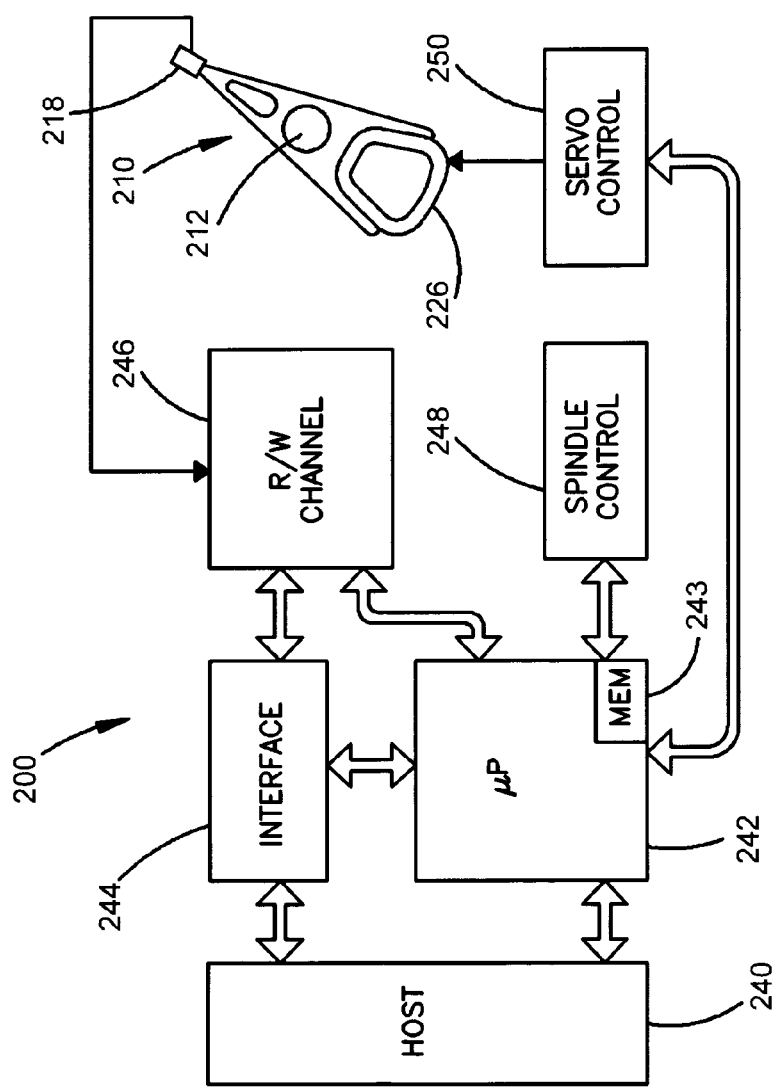
FIG. 2 illustrates the example functional components of a disc drive

FIG. 2 illustrates the primary functional components of a disc drive incorporating one of the various implementations of the described technology and generally shows the main functional circuits that are resident on the disc drive printed circuit board and used to control the operation of the disc drive. The disc drive is operably connected to a host computer 240 in a conventional manner. Control communication paths are provided between the host computer 240 and a disc drive microprocessor 242, the microprocessor 242 generally providing top level communication and control for the disc drive in conjunction with programming for the microprocessor 242 stored in microprocessor memory (MEM) 243. The MEM 243 can include random access memory (RAM), read only memory (ROM) and other sources of resident memory for the microprocessor 242.

The discs are rotated at a constant high speed by a spindle motor control circuit 248, which typically electrically commutates the spindle motor through the use, typically, of back electromotive force (BEMF) sensing. During a seek operation, wherein an actuator 210 moves heads 218 between tracks on the storage media, the position of the heads 218 is controlled through the application of current to the coil 226 of a voice coil motor. A servo control circuit 250 provides such control. During a seek operation the microprocessor 242 receives information regarding the velocity of the head 218, and uses that information in conjunction with a velocity profile stored in memory 243 to communicate with the servo control circuit 250, which will apply a controlled amount of current to the voice coil motor coil 226, thereby causing the actuator assembly 210 to be pivoted.

Data is transferred between the host computer 240 or other device and the disc drive by way of an interface 244, which typically includes a buffer to facilitate high speed data transfer between the host computer 240 or other device and the disc drive. Data to be written to the disc drive is thus passed from the host computer 240 to the interface 244 and then to a read/write channel 246, which encodes and serializes the data and provides the requisite write current signals to the heads 218. To retrieve data that has been previously stored in the data storage device, read signals are generated by the heads 218 and provided to the read/write channel 246, which performs decoding and error detection and correction operations and outputs the retrieved data to the interface 244 for subsequent transfer to the host computer 240 or other device.

In an exemplary implementation, servo control 250 in the disc drive includes a power amp, a controller, and a memory containing program code for detecting a large shock, performing corrective action, and/or performing RAW verification.

Figure 3:
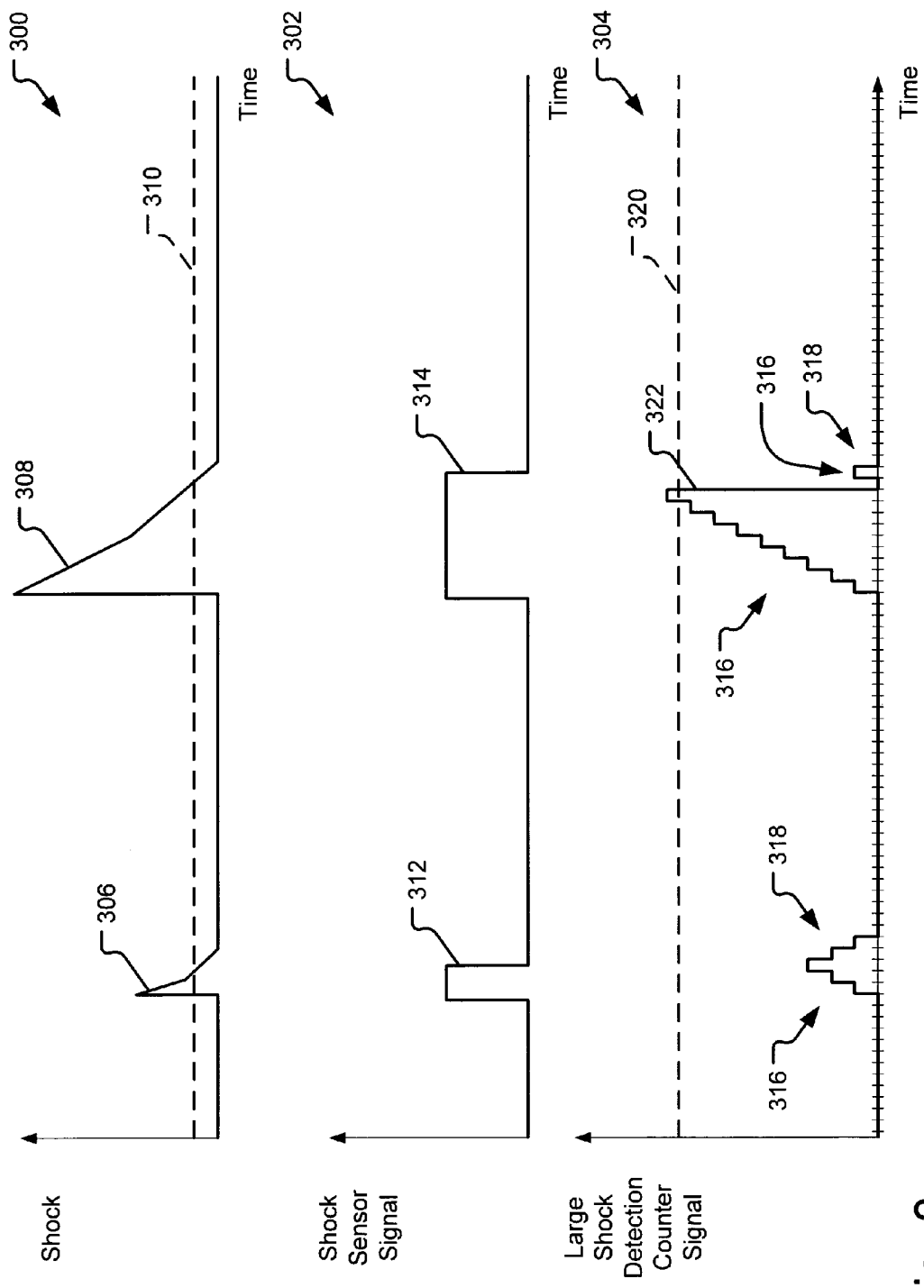
FIG. 3 illustrates exemplary time-based charts relating to detection of a large shock.

FIG. 3 illustrates exemplary time-based charts 300, 302, and 304 relating to detection of a large shock. A typical shock sensor is an analog device, such as a vibration accelerometer, that continuously monitors external physical shocks to the system, such as bump or a shake, although other shock sensors may be used. Two shocks 306 and 308 are represented in chart 300. When a shock is experienced and exceeds some physical shock threshold 310, the shock sensor issues shock signal indicating the presence of a shock, shown as pulses 312 and 314, each of which substantially sustains for the period of time the shock exceeds the physical shock threshold.

Output of a shock sensor is monitored by a large shock detector, which samples the output of the shock sensor over multiple sample periods, designated by the hash marks on the X-axis of chart 304. In one implementation, the sample period corresponds with a servo interrupt, but other sample periods could be employed. For every sample period in which the shock sensor indicates a shock, the shock detection counter is incremented (see increments 316). For every sample period in which the shock sensor does not indicate a shock, the shock detector counter is decremented (see decrements 318), limited to no less than zero. If the shock detector counter exceeds a large shock threshold 320, a large shock is indicated by a large shock signal and the counter is reset to zero (see reset 322). In this manner, the shock detector counter tracks a sequence of shock sensor pulses to determine whether a large shock has occurred, relative to a large shock threshold.

Upon the detection of a large shock, as indicated by the large shock signal, the system can take a variety of corrective actions. In one implementation, the servo control circuitry can operate the actuator assembly to execute a series of seeks that can dislodge particles from the recording head. For example, the servo control circuitry can enter an operational mitigation mode that forces the actuator assembly to execute a series of full stroke seeks to dislodge any particles on the recording head. In a full stroke seek, the recording head is moved rapidly between the outer diameter of the storage medium disc and the inner diameter of the storage medium disc. Such corrective action seeks can "fling" deposited particles from the recording head. Furthermore, such corrective action seeks can also sweep particles from the storage media surface, in some circumstances.

Alternatively, the servo control circuitry can enter a load mitigation mode in which the actuator assembly is set to execute one or more corrective action seeks after each of a certain number of load operations after the large shock detection. In this manner, the server control circuitry attempts to dislodge any particles deposited on the recording head or the storage media surface when the actuator assembly is loaded from the ramp to the disc.

Corrective action may also involve multiple stages. For example, in one implementation, the servo control circuitry may include multiple types of corrective action seeks. For example, upon detected a large shock, the servo control circuitry may first perform a first type of corrective action seek (e.g., vibration) to fling a particle from the recording head and then a second type of corrective action seek (e.g., full stroke seeks) to sweep the dislodged particle from the disc surface (and otherwise fling any remaining particle from the recording head).

Corrective action may also involve a specific pattern. For example, one or more corrective action seeks may sweep in a pattern across the disc surface to achieve a desired sweeping coverage of the surface over many rotations of the disc. Such patterns may be emphasized along the ID and/or the OD, may be set to obtain increased sweep coverage over the surface of the disc, may emphasize sweeping of certain tracks of sectors of the disc, or may be configured to achieve other ends.

It should be understood from the description herein that the detection of a large shock may occur if multiple shorter shock events occur in rapid enough succession to cause the large shock counter to eventually exceed the large shock threshold. Accordingly, multiple proximal shock events can combined to result in the detection and indication of a large shock event.

Figure 4:
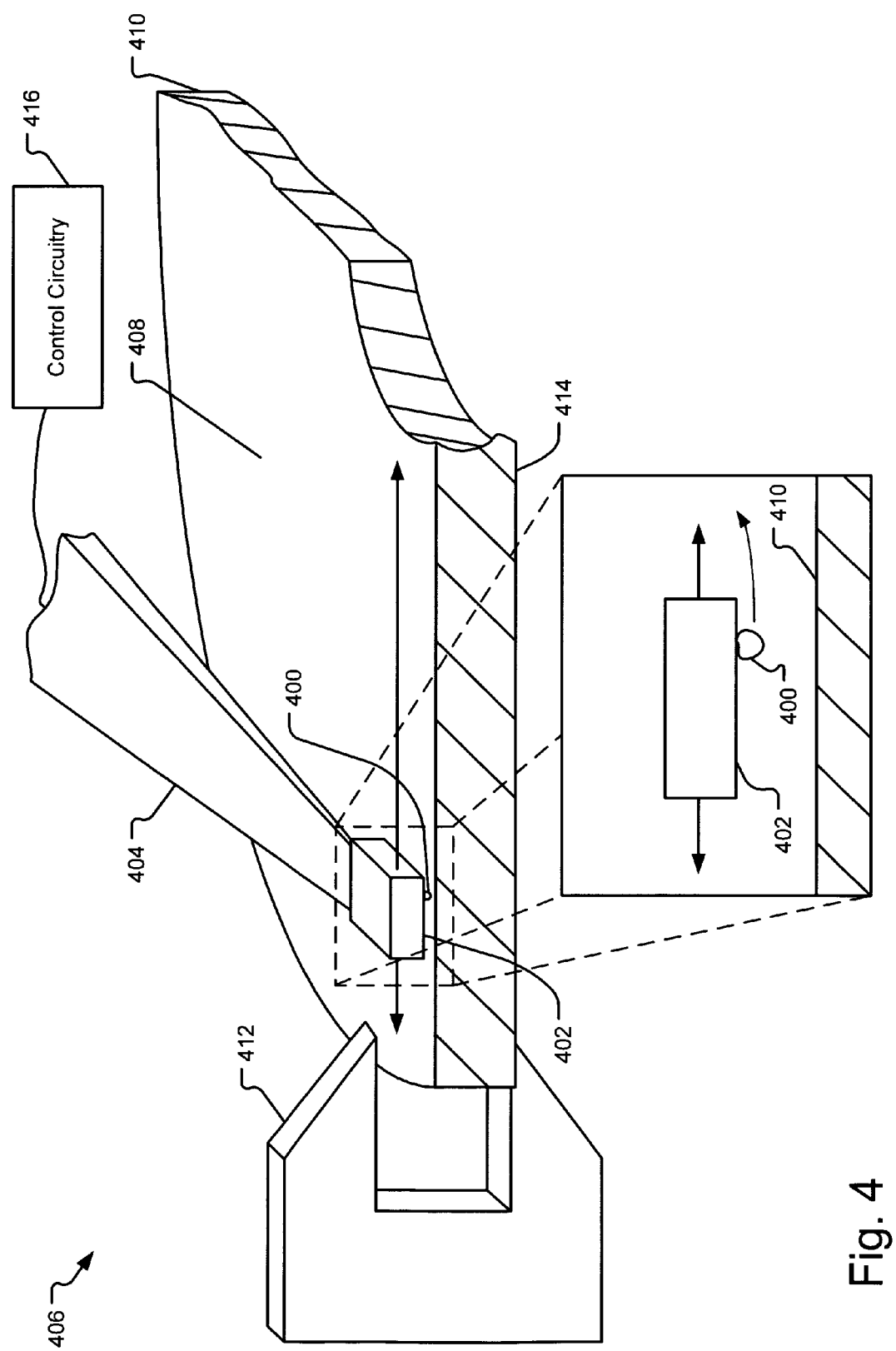
FIG. 4 illustrates a particle deposited on a recording head attached to an actuator assembly of an example disc drive.

FIG. 4 illustrates a particle 400 deposited on a recording head 402 attached to an actuator assembly 404 of an example disc drive 406. During normal operation, the recording head 402 flies above a surface 408 of a storage medium disc 410, as the storage medium disc 410 rotates. When non-operational, the actuator assembly 404 is parked or unloaded to the ramp assembly 412. Note that the ramp assembly 412 has two ramp surfaces, one on each side of the storage medium disc 410. The ramp surface on the underside of the storage medium disc 410, as pictured, is configured to received a second actuator assembly (not shown), which flies relative to the opposite surface 414 of the storage medium disc 410. However, it should be understood that other ramp assembly configurations are also contemplated.

Responsive to detection of a large shock, control circuitry 416 causes the actuator assembly 404 to execute a corrective action seek, such as a full stroke seek or some other movement sufficient to dislodge the particle 400 from the recording head 402. A full stroke seek represents a movement of the recording head 402 between the outer diameter and the inner diameter of the storage medium disc 410. For example, a full stroke seek may travel from ID to OD or vice versa. Other movements may include, partial seeks, rapid and repetitive full stroke seeks, vibrations, a concussive movement in which the actuator assembly impacts against another structure, etc. In one implementation, control circuitry 416 includes a power amp, a controller, and flash memory containing control program code, although other circuitry implementations may be employed. For example, the control circuitry 416 can control a voice coil motor that manipulates the position of the actuator assembly 404 relative to the storage medium disc 410.

Figure 5:
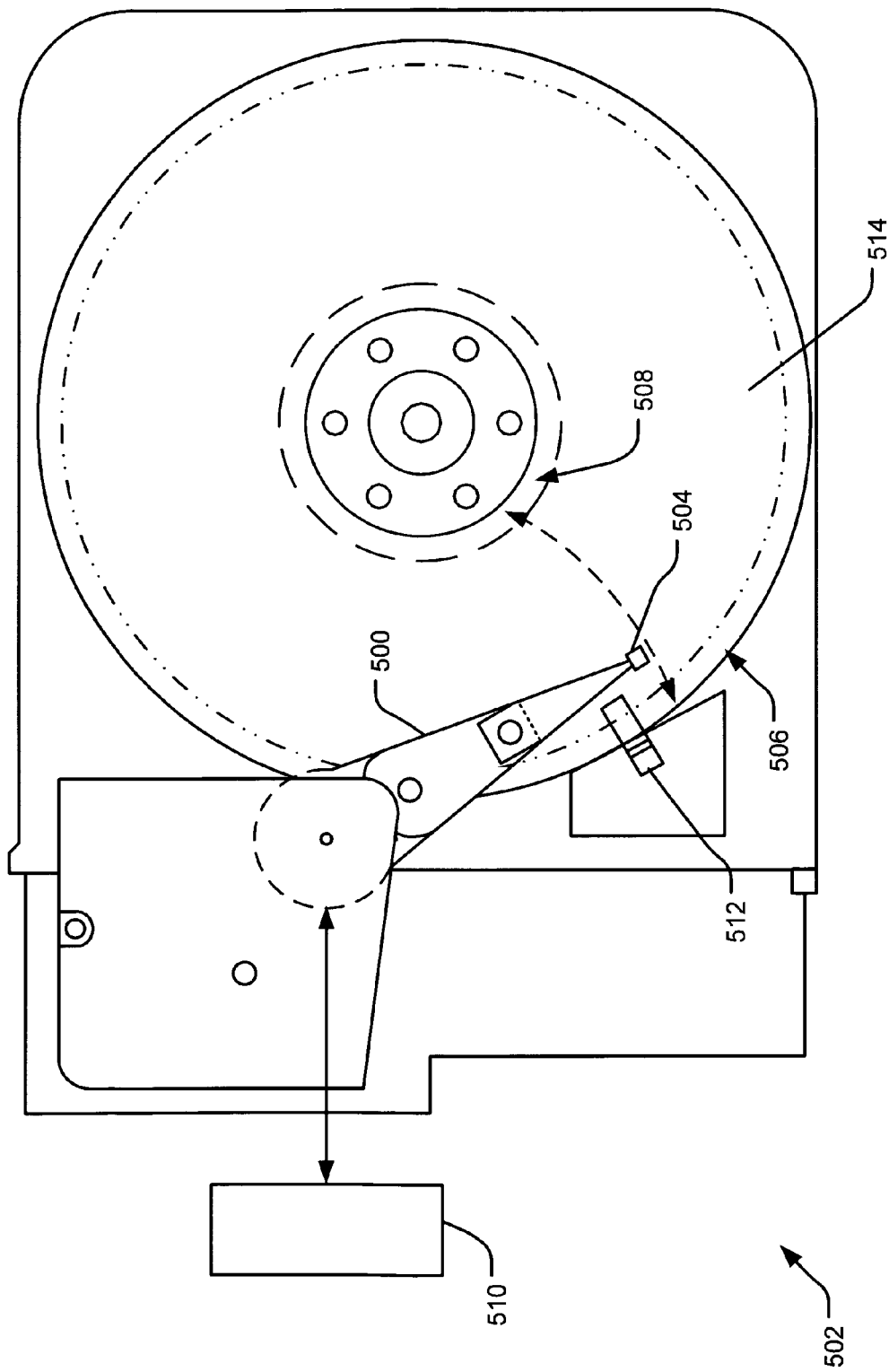
FIG. 5 illustrates an example corrective action seek by an actuator assembly of a disc drive.

FIG. 5 illustrates an example corrective action seek by an actuator assembly 500 of a disc drive 502. The example corrective action seek is shown as moving a recording head 504 on the actuator assembly 500 between the outer diameter 506 and the inner diameter 508 of the storage medium disc 514. It should be understood, however, that other corrective action seeks may be employed, including vibrations, concussive movement, etc. Control circuitry 510 manages detection of large shocks, the execution of the corrective action seeks, and the scheduling of corrective action seeks at a certain number of load operations after detection of a large shock. A ramp assembly 512 is shown at the outer diameter 506 and is used to unload the actuator assembly 500 from the storage medium disc 514 and to load the actuator assembly 500 to the storage medium disc 514

Figure 6:
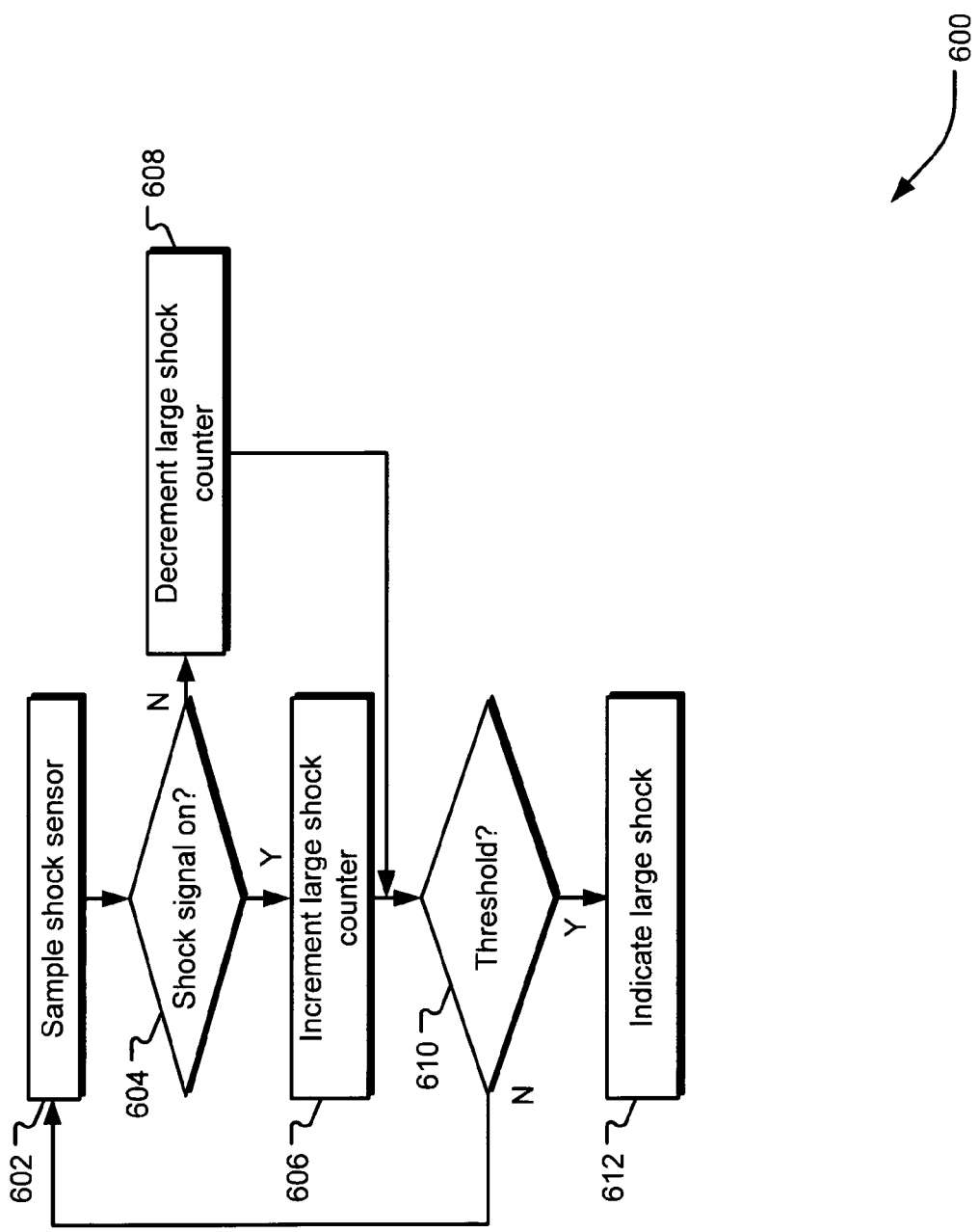
FIG. 6 illustrates example operations for detecting a large shock.

FIG. 6 illustrates example operations 600 for detecting a large shock. A shock sensor detects a shock, issuing a shock signal while the shock registers above a physical shock threshold associated with the shock sensor. A sampling operation 602 samples the shock sensor output. A decision operation 604 determines whether the shock signal is "on" during the current sample period. If so, an incrementing operation 606 increments a large shock counter. If not, a decrementing operation 608 decrements the large shock counter, with a lower limit (such as zero).

If a decision operation 610 determines that the counter satisfies a large shock threshold in the current sample period, a large shock is detected and indicated (see indicating operation 612). An indication can take any form, but may include a write operation to a register or memory, a change in an analog or digital signal, an interrupt, etc. Having detected the large shock, the control circuitry can execute one or more of the corrective actions described herein.

Figure 7:
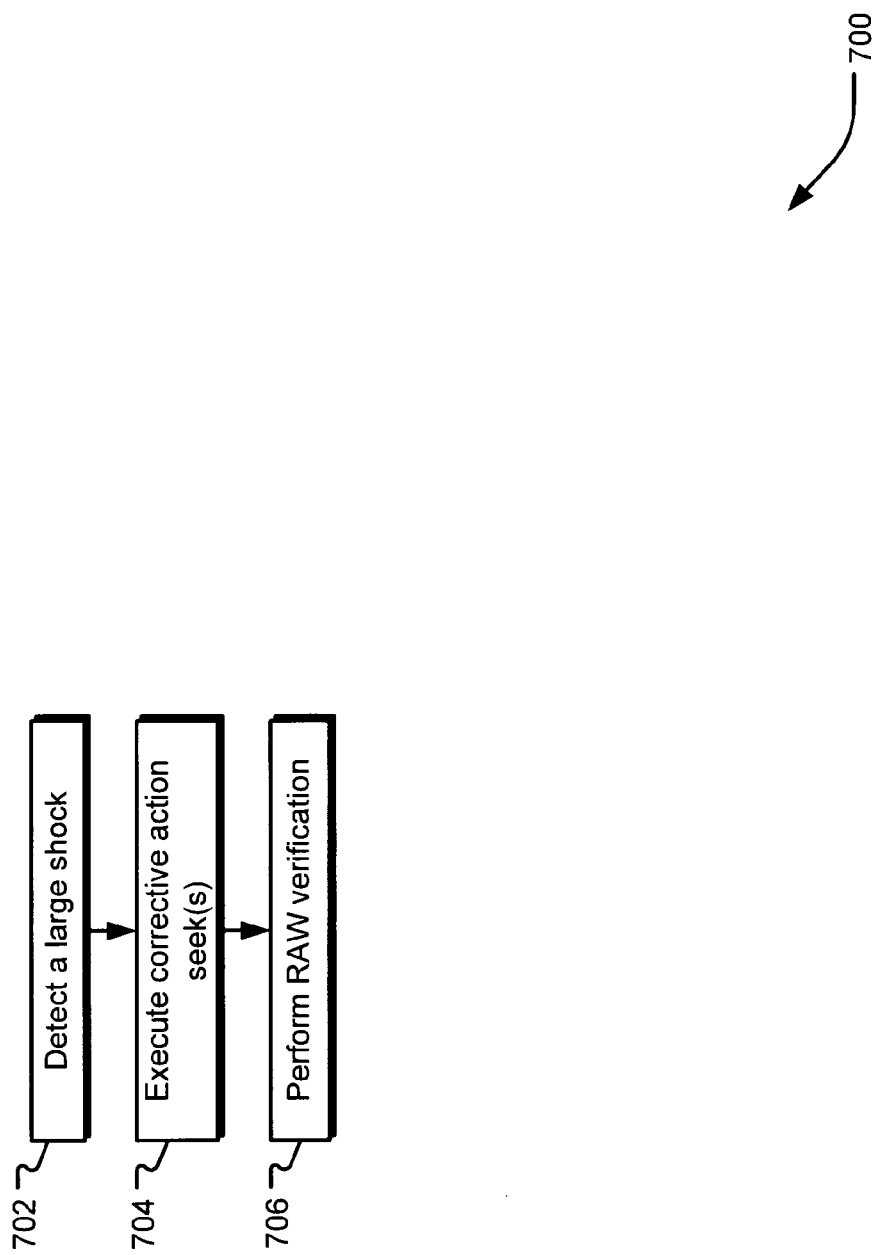
FIG. 7 illustrates example operations for mitigating large shock particle effects after a large shock.

FIG. 7 illustrates example operations 700 for mitigating large shock particle effects after a large shock. A detection operation 702 detects a large shock. A corrective action 704 executes as corrective action seek, such as a full stroke seek, a vibration, a concussive seek, etc. The corrective action seek can dislodge one or more particles deposited on the recording head (as well as elsewhere on the actuator assembly). Likewise, a corrective action seek may dislodge one or more particles from the storage media surface. It should be understood that a sequence of corrective action seeks may be combined (e.g., in rapid succession) to dislodge a particle. A verification operation 706 performs a RAW verification to confirm that the write operation of the system is acceptable. If not, operations 704 and 706 can be repeated as needed.

Figure 8:
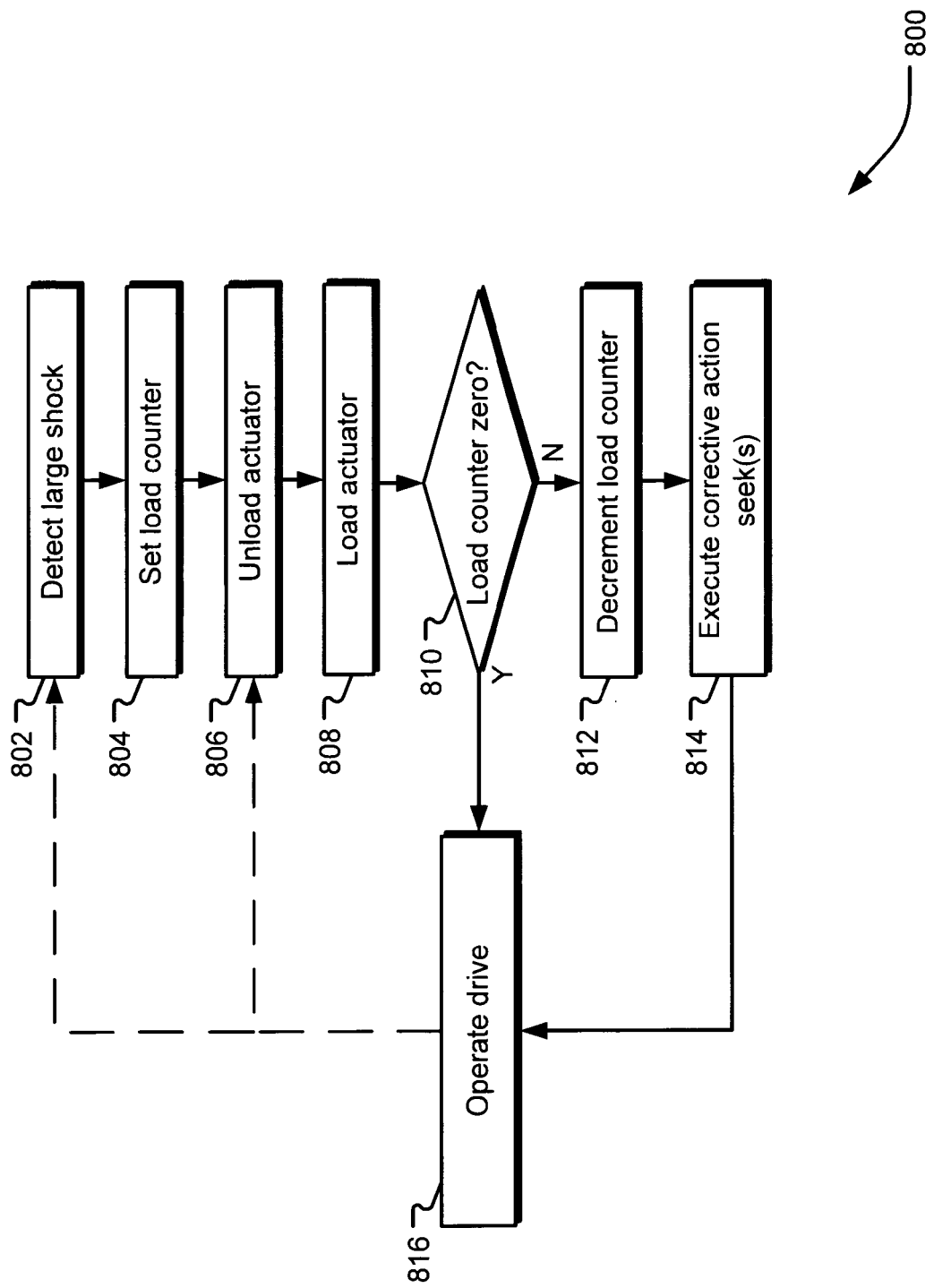
FIG. 8 illustrates example operations for mitigating large shock particle effects on load events.

FIG. 8 illustrates example operations 800 for mitigating large shock particle effects on load events. A detection operation 802 detects a large shock. A counter operation 802 sets a counter to the number of load events that are to be accompanied by at least one corrective action seek. It is likely that the detected shock resulted in unloading the recording head from the storage media, although the unload operations can be caused by a variety of events. Regardless of the reason or timing, the actuator assembly is unloaded at some point in time from the storage media to a ramp in an unload operation 806.

Under normal conditions, a load operation 808 loads the actuator assembly back to the storage media. If a decision operation 810 determines that the load counter equals zero. If so, an operation 816 operates the disc drive normally until a large shock is detected by operation 802 or the actuator assembly is unloaded by operation 806. If the load counter does not equal zero in decision operation 810, then a correction operation 812 executes at least one corrective action seek, and processing proceeds to operation 816. The correction action operation 812 may execute a sequence of corrective action seeks (e.g., in rapid succession).

Embodiments of the present invention will be discussed with reference to a magnetic disc drive. One skilled in the art will recognize that the present invention may also be applied to any data storage device, such as an optical disc drive, a magneto-optical disc drive, or a compact disc drive, that is capable of operating in two or more power levels. Further, one skilled in the art will understand that embodiments of the present invention are equally applicable to any type of electrical or electronic device capable of operating at more than one power level. For example, devices that may implement embodiments of the present invention include but are not limited to notebook computers, handheld devices such as Personal Digital Assistants (PDAs), cell phones, office equipment such as copiers and fax machines, etc.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method of detecting a large shock, the method comprising:
    indicating that the large shock has been detected if a sequence of shock sensor pulses satisfies a large shock threshold; and
    executing one or more corrective action seeks, responsive to detecting the large shock.

2. The method of claim 1 further comprising:
    performing a read after write verification, responsive to executing one or more corrective action seeks.

3. The method of claim 1 wherein the detecting operation comprises:
    monitoring output of the shock sensor over a sequence of sample periods;
    incrementing a large shock counter if a shock sensor pulse is present in a sample period;
    decrementing the large shock counter if a shock sensor pulse is not present in a sample period; and
    indicating the large shock if the large shock counter exceeds the large shock threshold.

4. The method of claim 1 wherein the one or more corrective action seeks dislodge a particle from a recording head.

5. The method of claim 1 further comprising:
    executing one or more corrective action seeks, responsive to detecting the large shock, wherein the one or more corrective action seeks include at least one full stroke seek.

6. The method of claim 1,
    wherein the one or more corrective action seeks include a vibration of a recording head.

7. The method of claim 1 further comprising:
    loading from a ramp assembly an actuator assembly supporting a recording head; and
    executing one or more corrective action seeks, responsive to loading the actuator assembly.

8. The method of claim 7 wherein the one or more corrective action seeks dislodge a particle from a recording head.

9. The method of claim 7 wherein the one or more corrective action seeks include at least one full stroke seek.

10. The method of claim 1 further comprising:
    setting a load count, responsive to detecting the large shock;
    loading from a ramp assembly an actuator assembly supporting a recording head;
    executing one or more corrective action seeks, responsive to unloading the actuator assembly; and
    decrementing the load count.

11. The method of claim 10 further comprising:
    repeating at each successive load event the loading, executing, and decrementing operations until the load count reaches zero.

12. A method comprising:
    detecting one or more shocks that satisfy a large shock threshold based on output of a shock sensor in a disc drive; and
    executing one or more corrective action seeks of an actuator assembly, responsive to detecting the one or more shocks.

13. The method of claim 12 further comprising:
    performing a read after write verification, responsive to executing one or more corrective action seeks.

14. The method of claim 12 wherein the detecting operation comprises:
monitoring output of the shock sensor over a sequence of sample periods;
incrementing a large shock counter if a shock sensor pulse is present in a sample period;
decrementing the large shock counter if a shock sensor pulse is not present in a sample period; and
indicating the large shock if the large shock counter exceeds the large shock threshold.

15. The method of claim 12 wherein the one or more corrective action seeks dislodge a particle from a recording head.

16. The method of claim 12 wherein the one or more corrective action seeks include at least one full stroke seek.

17. The method of claim 12 wherein the one or more corrective action seeks include a plurality of seeks, wherein the actuator arm is swept in a predefined seek pattern over a disc of the disc driver, wherein the predefined seek pattern spans multiple rotations of the disc.

18. The method of claim 12 further comprising:
setting a load count, responsive to detecting the one or more shocks;
loading from a ramp assembly an actuator assembly supporting a recording head;
executing one or more corrective action seeks, responsive to unloading the actuator assembly; and
decrementing the load count.

19. The method of claim 18 further comprising:
repeating at each successive load event the loading, executing, and decrementing operations until the load count reaches zero.

20. The method of claim 12 wherein the executing operation comprises:
executing at least one type of corrective action seek of the actuator assembly; and
executing at least another type of corrective action seek of the actuator assembly.

21. Apparatus comprising:
control circuitry configured to detect one or more shocks that satisfy a large shock threshold based on output of a shock sensor and to execute one or more corrective action seeks of an actuator assembly, responsive to detection of the one or more shocks.

22. The apparatus of claim 21 wherein the one or more corrective action seeks include at least one full stroke seek.

* * * * *